United States Patent

Nantz et al.

[11] Patent Number: 5,973,412
[45] Date of Patent: Oct. 26, 1999

[54] VEHICLE SECURITY SYSTEM WITH LOW POWER TRANSMITTER

[75] Inventors: John Nantz, Brighton; Tom Tang, Farmington Hills, both of Mich.

[73] Assignee: Lear Corporation, Southfield, Mich.

[21] Appl. No.: 09/098,153

[22] Filed: Jun. 16, 1998

[51] Int. Cl.[6] .................................................. B60R 25/10
[52] U.S. Cl. ...................... 307/10.5; 307/10.2; 340/426; 340/539; 340/825.69; 375/310
[58] Field of Search .................. 307/10.5, 10.4, 307/10.2; 340/539, 426, 825.69, 825.72, 425.5; 375/310

[56] References Cited

U.S. PATENT DOCUMENTS

| | | |
|---|---|---|
| 4,110,738 | 8/1978 | Sattin ........................................ 340/539 |
| 4,413,261 | 11/1983 | Greenberg ........................... 340/825.69 |
| 4,733,215 | 3/1988 | Memmola ................................ 340/426 |
| 5,132,660 | 7/1992 | Chen et al. .............................. 340/426 |

*Primary Examiner*—Albert W. Paladini
*Attorney, Agent, or Firm*—Niro, Scavone, Haller & Niro

[57] ABSTRACT

A low power transmitter for use in a vehicle security system includes an oscillator that is isolated from a transmitter antenna. An amplifier is coupled between the oscillator and the antenna to achieve the isolation. The amplifier and the isolator are tied to a single signal source so that each is initiated at the same time. The amplifier has a faster turn-on time than the oscillator so that the amplifier is fully operational at the instant it receives an output signal from the oscillator. The amplifier amplifies the single frequency of the oscillator and that amplified signal is transmitted by the antenna to a controller, which responsively controls the vehicle security system.

16 Claims, 1 Drawing Sheet

VEHICLE SECURITY SYSTEM WITH LOW POWER TRANSMITTER

BACKGROUND OF THE INVENTION

This invention generally relates to vehicle security systems and, more particularly, to a low power transmitter for remote access to the vehicle security system.

A variety of vehicle security systems are available today. Some are installed by the manufacturer while others are available on an after-market basis. In most vehicle security systems, a remote access feature is provided through a key fob. The key fob typically includes one or more buttons that can be pressed to activate or access the vehicle security system. For example, a button can be pressed to unlock the vehicle doors from some distance away from the vehicle.

In some markets and areas, it is becoming increasingly important to customize vehicle security systems to fit within certain operating parameters. For example, in Japan, the signals that are transmitted by a remote transmitter must be of a much lower power level than that typically used in the United States. Current attempts to address this situation utilize special integrated circuitry within the key fob transmitter. Alternatively, metal shielding has been introduced to isolate the various components within the key fob, which permits lower power signal operation. Neither of these solutions is satisfactory because they both introduce undesirable cost into the system.

There is another difficulty in designing a system that operates at a low power level. In conventional systems, the transmitter includes an oscillator and an antenna. The antenna is typically coupled with the collector of the oscillator and, therefore, is a load on the oscillator. Since the antenna is influenced by outside factors, the oscillator must be robust in the conventional arrangements. An oscillator that is more robust carries with it the undesirable drawback of yielding higher harmonic levels if low power levels are used. Another significant problem with conventional designs is that lowering power within the circuitry compromises the performance of the oscillator and, therefore, the output signal from the key fob.

There is a need for a transmitter for use with a vehicle security system, for example, that allows for low power operation without compromising oscillator performance. This is a challenge that has not been met prior to this invention.

SUMMARY OF THE INVENTION

In general terms, this invention is a transmitter for use in a vehicle security system that operates at a much lower power than conventional systems. The transmitter of this invention includes at least one switch that is selectively activated by a user to activate a signal for controlling the vehicle security system. The transmitter includes an oscillator and an antenna with an amplifier coupled between the oscillator and the antenna. The amplifier isolates the oscillator from the antenna. The oscillator produces an output signal responsive to the switch being activated. The amplifier amplifies the output signal of the oscillator and the antenna transmits the amplified signal from the transmitter. A control module supported on the vehicle includes a receiver that receives the transmitted signal and responsively controls the vehicle security system. This invention is particularly useful for remote keyless entry systems.

In the preferred embodiment, the transmitter circuitry is made from discrete circuit components arranged so that the amplifier isolates the oscillator from the antenna. The oscillator preferably has a turn on time that is longer than the turn on time for the amplifier. The amplifier and oscillator preferably are connected to a single signal source so that they are both initiated at the same time. Since the amplifier has a shorter turn on time than the oscillator, the amplifier is fully operational prior to receiving the output signal from the oscillator. This arrangement avoids the undesirable harmonics that otherwise may be introduced and maintains the stability of the system without requiring a robust oscillator design.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
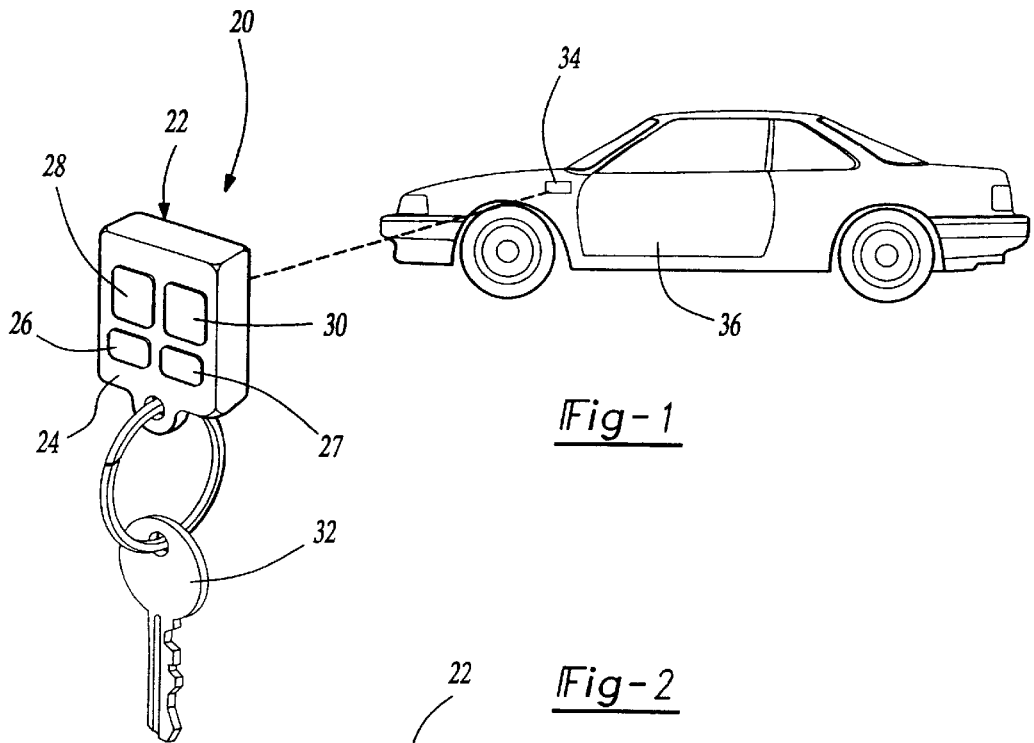
FIG. 1 is a diagrammatic illustration of a vehicle security system designed according to this invention.

FIG. 1 diagrammatically illustrates a vehicle security system 20. A transmitter 22 is shown as a key fob having a plastic housing 24 that is conveniently sized to be carried in a purse or pocket, for example. A plurality of switches 26, 27, 28 and 30 are selectively activated by a user to achieve a desired operation in the vehicle security system. As illustrated, the key fob conveniently serves as a key ring for holding keys 32 in a conventional manner.

A controller 34 responds to the signals sent from the transmitter 22. The controller is supported on a vehicle 36 and controls various security system functions in a conventional manner.

Figure 2:
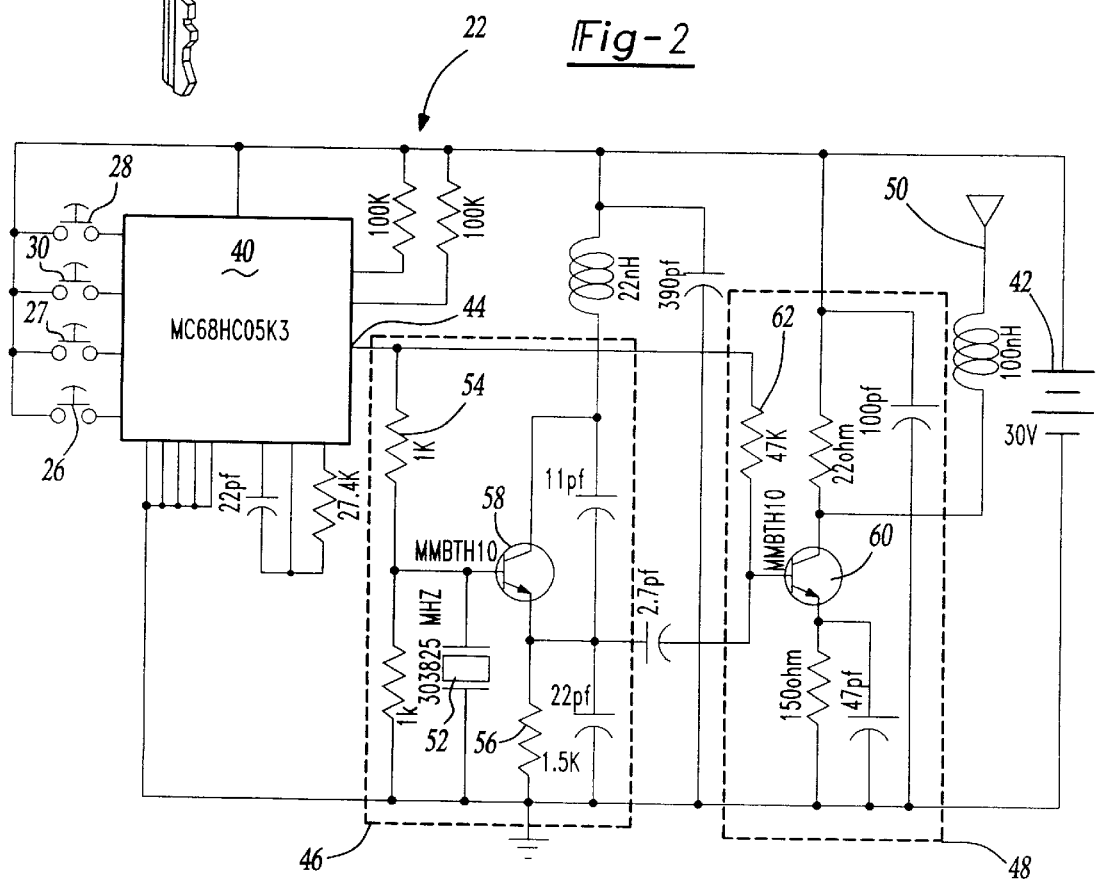
FIG. 2 is a schematic circuit diagram of the preferred embodiment of the transmitter of this invention.

FIG. 2 schematically illustrates the preferred arrangement of the circuitry within the transmitter 22. In the preferred embodiment, the circuitry is realized using discrete circuit components having the values shown in FIG. 2, rather than customized integrated circuit chips, which can prove to be more expensive. This invention, however, is not limited to a circuit utilizing discrete components.

When a vehicle owner activates one of the switches 26–30, the microprocessor 40, which is powered by a battery 42, provides a pulse signal at an output 44. The single output 44 is coupled directly to an oscillator stage 46 and an amplifier stage 48. Having the oscillator stage 46 and the amplifier stage 48 coupled to the same signal source 44 provides the advantage of initiating the oscillator stage 46 and the amplifier stage 48 at the same time. The oscillator stage 46 preferably has a turn-on time that is longer than the turn-on time of the amplifier stage 48. Since each receives the signal from the output 44 at the same time, the amplifier stage 48 is fully operational and waiting to receive a signal from the oscillator stage 46. The amplifier stage 48 amplifies the signal from the oscillator stage 46 and provides that amplified signal to an antenna 50. The output signal from the transmitter 22 comes from the antenna 50 and is communicated to the controller 34 of the vehicle security system.

The oscillator stage 46 preferably includes an arrangement of discrete circuit components as illustrated in FIG. 2. An oscillator 52 is coupled to the signal source 44 through the resistor 54, which preferably has a value of 1 KOhms.

The resistance value of the resistor 54 and the resistor 56, which is coupled to the emitter side of the transistor 58, provide a low bias and ensure that the oscillator 52 runs on very low current. In the preferred embodiment, the current supplied to the oscillator 52 is on the order of several microamps.

The oscillator 52 is essentially starved because it is running at such a low current. In that sense, the oscillator stage 46 is not considered stable according to conventional practices. The arrangement of the amplifier stage 48, however, renders the oscillator stage 46 operable and reliable to achieve its desired purpose.

The amplifier stage 48 preferably includes a transistor 60 that is coupled to the signal source 44 through a resistor 62. The resistance of the resistor 62 preferably is approximately 47 KOhms. The resistance value of the resistor 62 preferably is much greater than the resistance value of the resistor 54. The high resistance provided by the resistor 62 effectively lightly couples the amplifier stage 48 to the oscillator stage 46. Having the two stages lightly coupled provides the significant advantage of isolating the antenna 50 from the oscillator 52. The first, oscillator stage 46 is useful for regulating the frequency while the second, amplifier stage 48 is used to regulate the power.

In the preferred embodiment, the oscillator stage 46 and the amplifier stage 48 operate exactly in phase. By controlling the signal bit width from the microprocessor 40, the two stages 46 and 48 can be maintained in continuous phase. When the amplifier stage 48 and the oscillator stage 46 are exactly in phase, harmonics are minimized, which results in better transmitter operation. Further, having a shorter turn-on time for the amplifier stage 48 ensures that the amplifier is fully energized and operational to await the signal from the oscillator stage 46, which avoids undesirable harmonics and maintains stability in the circuit. In other words, the ramped up amplifier stage 48 does not undergo the phenomenon known as "jumping" when it receives the signal from the oscillator stage 46 and, therefore, avoids undesirable high level harmonics. To the extent that any harmonics are generated by the oscillator stage 46, they are virtually eliminated in the coupling between the oscillator stage 46 and the amplifier stage 48.

The preferred embodiment operates at very low power compared to conventional designs. The operating current value within the circuit preferably does not exceed four milliamps. The output signal from the antenna 50 preferably is less than approximately 60 db microvolts/m and most preferably is approximately 54 db microvolts/m. The maximum harmonic radiation level preferably is approximately 30 db microvolts/m. The low power transmitter 22 is, therefore, useful for vehicle security systems, especially those utilizing remote keyless entry, even in countries or markets that place stringent requirements and restrictions on the power level of the transmitted signals.

As can be appreciated, the specific components illustrated in FIG. 2 may be substituted with other components or could be realized through an integrated circuit. In the preferred embodiment, however, the discrete circuit components are utilized to keep costs down while rendering the transmitter 22 effective for operating at low power. This is accomplished primarily by isolating the oscillator stage 46 from the antenna 50 with the amplifier stage 48 coupled between the two. Additionally, having the amplifier stage 48 stable before it receives the signal from the oscillator stage 46 is important. These two features provide the ability to operate at low power while avoiding the relatively high harmonics that typically are associated with a low power oscillating circuit arrangement.

Depending upon which of the switches 26–30 is activated by the user, the microprocessor 40 generates a corresponding signal at the output 44. Therefore, the transmitted signal from the antenna 50 has a meaning or value that corresponds to the desired operation indicated by the selected switch. The oscillator stage 46 produces an output signal corresponding the signal received from the microprocessor output 44 and the amplifier stage 48 amplifies the single frequency of the oscillator output signal. The controller 34 responds accordingly upon receiving the transmitted signal.

The preceding description is exemplary rather than limiting in nature. Variations and modifications may become apparent that do not necessarily depart from the purview and spirit of this invention. The scope of legal protection is limited only by the following claims.

We claim:

1. A vehicle security system, comprising:
   a remote transmitter including a switch that is selectively activated by a user and having an oscillator and an antenna with an amplifier coupled between said oscillator and said antenna to thereby isolate said oscillator from said antenna, said oscillator producing an output signal responsive to said switch being activated, said amplifier amplifying the output signal of said oscillator and said antenna transmitting said amplified signal from said transmitter, said oscillator and said amplifier being coupled to a single source of input signals such that said oscillator and said amplifier are initiated simultaneously responsive to said switch being activated; and
   a control module supported on the vehicle that receives the transmitted signal from said transmitter and responsively controls the vehicle security system.

2. The system of claim 1, wherein said oscillator is coupled to said single signal source through a first energy absorbing load having a first resistance and said amplifier is coupled to said single signal source through a second energy absorbing load having a second resistance that is much greater than said first resistance.

3. The system of claim 1, wherein said amplifier has a turn on time that is less than a turn on time of said oscillator such that said amplifier is completely in phase with said oscillator upon said oscillator providing a signal to said amplifier.

4. A vehicle security system, comprising:
   a remote transmitter including a switch that is selectively activated by a user and having an oscillator and an antenna with an amplifier coupled between said oscillator and said antenna to thereby isolate said oscillator from said antenna, said oscillator producing an output signal responsive to said switch being activated, said amplifier amplifying the output signal of said oscillator and said antenna transmitting said amplified signal from said transmitter;
   a control module supported on the vehicle that receives the transmitted signal from said transmitter and responsively controls the vehicle security system; and
   wherein said transmitted signal has a harmonic level that is approximately 30 db microvolts/m.

5. A vehicle security system, comprising:
   a remote transmitter including a switch that is selectively activated by a user and having an oscillator and an antenna with an amplifier coupled between said oscillator and said antenna to thereby isolate said oscillator from said antenna, said oscillator producing an output signal responsive to said switch being activated, said amplifier amplifying the output signal of said oscillator and said antenna transmitting said amplified signal from said transmitter;

a control module supported on the vehicle that receives the transmitted signal from said transmitter and responsively controls the vehicle security system; and wherein said transmitted signal from said antenna has a power level that is less than 60 db microvolts/m.

6. The system of claim 5, wherein said transmitted signal power lever is approximately 54 db microvolts/m.

7. A transmitter for use in vehicle security system, comprising:

a housing;

a plurality of switches supported by said housing, said switches being selectively activated by a user to control a corresponding plurality of functions of the vehicle security system; and a signal generator having a single signal output and generating a signal responsive to one of said switches being activated;

an oscillator coupled to said single signal output through a first energy absorbing load having a first resistance, said oscillator having a first turn on time;

an amplifier coupled to said single signal output through a second energy absorbing load having a second resistance that is greater than said first resistance and wherein said amplifier has a second turn on time that is lower than said first turn on time, said amplifier amplifying an output signal from said oscillator immediately after said first turn on time elapses; and an antenna that transmits a transmitter signal based upon the amplified signal from said amplifier.

8. The transmitter of claim 7, wherein said oscillator and said antenna are isolated from each other by said amplifier.

9. The transmitter of claim 7, wherein said signal generator generates a signal having a current value that is less than approximately 4 milliamps.

10. The transmitter of claim 7, wherein said signal transmitted by said antenna has a harmonic level that is less than approximately 30 db microvolts/m.

11. The transmitter of claim 7, wherein said second resistance is more than 20 times said first resistance.

12. The transmistter of claim 7, wherein said second resistance is more than 40 times said first resistance.

13. The system of claim 7, further comprising a controller supported on the vehicle that receives the transmitted signal from said antenna and responsively controls the vehicle security system.

14. The system of claim 13, wherein said transmitter includes a plurality of said switches and wherein each said switch causes said transmitted signal to be different such that said controller controls a portion of the security system based upon which one of said switches is activated by a user.

15. The transmitter of claim 7, wherein said transmitted signal from said antenna has a power level that is less than approximately 60 db microvolts/m.

16. The transmitter of claim 15, wherein said transmitted signal power lever is approximately 54 db microvolts/m.

* * * * *